April 1, 1924.
H. E. RUSSELL
FISH LURE
Filed April 21, 1923
1,489,156
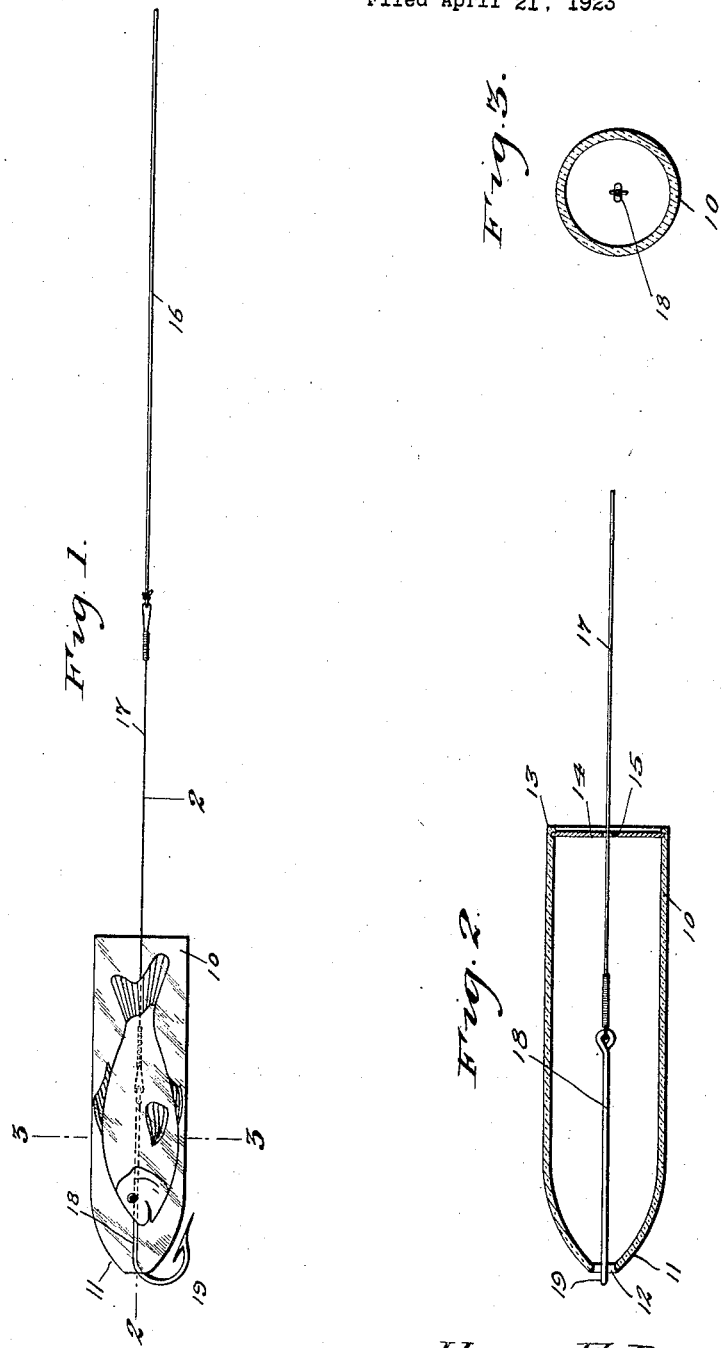
Henry E. Russell INVENTOR Patented Apr. 1, 1924.

1,489,156

UNITED STATES PATENT OFFICE.

HENRY E. RUSSELL, OF MITCHELL, NEBRASKA.

FISH LURE.

Application filed April 21, 1923. Serial No. 633,717.

*To all whom it may concern:*

Be it known that I, HENRY E. RUSSELL, a citizen of the United States, residing at Mitchell, in the county of Scotts Bluff and State of Nebraska, have invented new and useful Improvements in Fish Lures, of which the following is a specification.

The object of this invention is to provide a fish lure for displaying live bait, the device being so constructed that the bait may be used for a considerable time without loss or injury.

A further object is to provide a device comprising a transparent container, with a closure therefor and means for securing this device and a hook to the line by the use of a single element extending through the container.

With the foregoing and other objects and advantages in view, the invention consists in the novel construction and arrangement of elements described, illustrated and claimed, it being understood that modifications may be made within the scope of the claim without departing from the spirit of the invention.

In the drawings, Figure 1 shows the device in side elevation; Figure 2 is a view in longitudinal section; Figure 3 is a section on line 3—3 of Figure 1.

A receptacle of glass or other transparent material is designated 10 and may be reduced at the forward end 11, being there provided with an aperture 12. The rear end 13 is closed by a disk or other similar element 14 having an aperture 15 therein.

The container may be of various sizes, to accommodate a minnow or other form of live bait, which is of course inserted before the disk is placed in position. The apertures provide for the entrance of water when the lure is submerged.

The line is designated 16, and connected therewith is a snare or the like 17 of material not readily observed in the water, this element 17 extending through the container and being secured to the shank 18 of hook 19, the bill of the hook being curved partly around the forward end of the container. The element 17 and the hook may therefore be of standard type, and it is only necessary to thread element 17 through the two apertures shown before effecting connection with line 16. The disk may be loose at the time of the threading operation.

The simplicity of the construction and the fact that the bait is protected from injury and loss, are features of importance.

What is claimed is:—

A device of the class described, comprising a transparent container having an opening at its forward end, a detachable apertured element for closing the opposite end, a hook having a shank passing through the opening at the forward end, and a flexible element connected with the hook and passing loosely through the apertured element at the rear end of the container.

In testimony whereof I affix my signature.

HENRY E. RUSSELL.